United States Patent
Yasuda et al.

(10) Patent No.: US 10,214,080 B2
(45) Date of Patent: Feb. 26, 2019

(54) SHADE DEVICE FOR VEHICLE

(71) Applicant: ASHIMORI INDUSTRY CO., LTD., Osaka-shi (JP)

(72) Inventors: Soshi Yasuda, Settsu (JP); Miki Endo, Settsu (JP)

(73) Assignee: Ashimori Industry Co., Ltd., Osaka-shi (JP)

(*) Notice: Subject to any disclaimer, the term of this patent is extended or adjusted under 35 U.S.C. 154(b) by 100 days.

(21) Appl. No.: 15/339,177

(22) Filed: Oct. 31, 2016

(65) Prior Publication Data
US 2017/0136855 A1 May 18, 2017

(30) Foreign Application Priority Data

Nov. 18, 2015 (JP) ................. 2015-225502

(51) Int. Cl.
*B60J 1/08* (2006.01)
*B60J 1/20* (2006.01)

(52) U.S. Cl.
CPC .......... *B60J 1/2013* (2013.01); *B60J 1/2033* (2013.01); *B60J 1/2044* (2013.01); *B60J 1/2052* (2013.01); *B60J 1/2086* (2013.01)

(58) Field of Classification Search
CPC ...... B60J 1/2013; B60J 1/2033; B60J 1/2025; B60J 1/2027; B60J 1/2044; B60J 1/2052; B60J 1/2058; B60J 1/2086; B60J 1/2022
USPC ....................... 160/370.22, 370.21
See application file for complete search history.

(56) References Cited

U.S. PATENT DOCUMENTS

| | | | | |
|---|---|---|---|---|
| 1,012,239 A | * | 12/1911 | Bourne | B60J 1/02 160/240 |
| 1,944,454 A | * | 1/1934 | Park | B60J 1/2019 160/265 |
| 3,022,064 A | * | 2/1962 | Russell | E05F 11/486 49/26 |

(Continued)

FOREIGN PATENT DOCUMENTS

| | | | | |
|---|---|---|---|---|
| DE | 19851469 A1 | * | 5/2000 | ............ B60J 1/2022 |
| DE | 102006047359 A1 | * | 6/2008 | ............ B60J 1/2022 |

(Continued)

OTHER PUBLICATIONS

Lin, English Translation of "DE 102011006994A1". Obtained from <http://ep.espacenet.com/> (Year: 2011).*

*Primary Examiner* — Katherine W Mitchell
*Assistant Examiner* — Johnnie A. Shablack
(74) *Attorney, Agent, or Firm* — Oblon, McClelland, Maier & Neustadt, L.L.P.

(57) ABSTRACT

A shade device for a vehicle includes: a shade; a retracting mechanism attached to a base end of the shade and retracting the shade in a stored state; a stay attached to a tip end of the shade; an extractable constant force spring; a rod, its tip end portion being attached to the stay and its base end portion being connected to the constant force spring, biased in a deploying direction of the shade by biasing force of the constant force spring, and transmitting the biasing force to the stay; a guide rail that stores the rod and an extracted portion of the constant force spring in the stored state of the shade, and guides the rod when the shade shifts from the stored state to the deploying state; and a locking mechanism that locks movement of the rod in the stored state of the shade.

3 Claims, 10 Drawing Sheets

(56) References Cited

U.S. PATENT DOCUMENTS

| | | | | |
|---|---|---|---|---|
| 3,788,631 A * | 1/1974 | Aldous | B21D 11/06 | 267/156 |
| 3,992,751 A * | 11/1976 | Foster | E05D 13/1276 | 16/197 |
| 4,095,370 A * | 6/1978 | Muehling | E05F 11/481 | 49/352 |
| 4,635,755 A * | 1/1987 | Arechaga | F03G 1/02 | 185/45 |
| 4,879,828 A * | 11/1989 | Dieringer | F41A 9/70 | 267/156 |
| 4,935,987 A * | 6/1990 | Sterner, Jr. | E05D 13/1276 | 16/197 |
| 5,309,678 A * | 5/1994 | Adachi | E05F 11/481 | 49/352 |
| 5,505,022 A * | 4/1996 | Shibata | E05F 11/481 | 49/349 |
| 5,513,469 A * | 5/1996 | Tajudeen | E05F 1/16 | 49/404 |
| 5,746,469 A * | 5/1998 | Nonaka | B60J 1/2011 | 296/97.4 |
| 6,061,963 A * | 5/2000 | Osborn | E05F 11/481 | 49/352 |
| 6,347,825 B2 * | 2/2002 | Seel | B60J 1/2027 | 160/370.22 |
| 6,598,929 B2 * | 7/2003 | Schlecht | B60J 1/2027 | 160/265 |
| 6,910,518 B2 * | 6/2005 | Zimmermann | B60J 1/2019 | 160/370.21 |
| 6,942,002 B1 * | 9/2005 | Williams | A47H 21/00 | 160/265 |
| 6,983,786 B2 * | 1/2006 | Chen | B60J 1/2025 | 160/370.22 |
| 6,990,710 B2 * | 1/2006 | Kunz | E05D 13/08 | 16/193 |
| 7,347,246 B2 * | 3/2008 | Ayran | B60J 1/2027 | 160/370.22 |
| 7,537,039 B2 * | 5/2009 | Fischer | B60J 1/2027 | 160/87 |
| 7,717,158 B2 * | 5/2010 | Lekar | B60J 1/2033 | 160/265 |
| 7,896,058 B2 | 3/2011 | Hansen | | |
| 7,918,490 B2 * | 4/2011 | Kriese | B60J 1/2086 | 296/219 |
| 8,033,313 B2 * | 10/2011 | Hansen | B60J 1/2086 | 160/265 |
| 8,104,822 B2 * | 1/2012 | Kriese | B60J 1/2086 | 160/370.21 |
| 8,312,912 B2 * | 11/2012 | Lin | B60J 1/2047 | 160/265 |
| 8,944,132 B1 * | 2/2015 | Floyd | A47G 5/02 | 160/23.1 |
| 9,186,959 B2 * | 11/2015 | Lin | B60J 1/12 | |
| 9,255,433 B2 * | 2/2016 | Imaoka | E05F 11/486 | |
| 9,469,178 B2 * | 10/2016 | Lee | B60J 1/2063 | |
| 9,476,242 B2 * | 10/2016 | Baker | E05D 13/1276 | |
| 9,776,484 B2 * | 10/2017 | Sichart | B60J 1/2033 | |
| 9,777,534 B2 * | 10/2017 | Lin | E06B 9/68 | |
| 2001/0022218 A1 * | 9/2001 | Schlecht | B60J 1/2022 | 160/370.22 |
| 2002/0060470 A1 * | 5/2002 | Schlecht | B60J 1/2019 | 296/97.4 |
| 2004/0163209 A1 * | 8/2004 | Pettit | E05D 13/08 | 16/197 |
| 2005/0257903 A1 * | 11/2005 | Schimko | B60J 1/2027 | 160/370.22 |
| 2006/0021283 A1 * | 2/2006 | Schultz | E05D 13/1276 | 49/445 |
| 2006/0065375 A1 * | 3/2006 | Chen | B60J 1/2019 | 160/370.22 |
| 2006/0260771 A1 * | 11/2006 | Takeuchi | B60J 1/2027 | 160/370.22 |
| 2007/0023152 A1 * | 2/2007 | Starzmann | B60J 1/2027 | 160/370.22 |
| 2008/0017335 A1 * | 1/2008 | Pohl | B60J 1/17 | 160/370.22 |
| 2008/0034667 A1 * | 2/2008 | Fischer | B60J 1/17 | 49/502 |
| 2008/0053630 A1 * | 3/2008 | Lekar | B60J 1/2072 | 160/370.22 |
| 2008/0216972 A1 * | 9/2008 | Starzmann | B60J 1/2086 | 160/310 |
| 2008/0216973 A1 * | 9/2008 | Walter | B60J 1/2027 | 160/313 |
| 2008/0230190 A1 * | 9/2008 | Hansen | B60J 1/2033 | 160/265 |
| 2009/0020236 A1 * | 1/2009 | Hansen | B60J 1/2033 | 160/275 |
| 2009/0078379 A1 * | 3/2009 | Hansen | B60J 1/2033 | 160/265 |
| 2010/0052230 A1 * | 3/2010 | Lin | B60J 1/2033 | 267/155 |
| 2012/0180958 A1 * | 7/2012 | Lin | E06B 9/42 | 160/127 |
| 2012/0180960 A1 * | 7/2012 | Oya | B60J 1/2038 | 160/370.21 |
| 2012/0186759 A1 * | 7/2012 | Lin | B60J 1/2022 | 160/370.22 |
| 2012/0193934 A1 * | 8/2012 | Lin | B60J 1/2022 | 296/97.8 |
| 2012/0205058 A1 * | 8/2012 | Lin | B60J 1/2022 | 160/370.22 |
| 2012/0247694 A1 * | 10/2012 | Ojima | B60J 1/2027 | 160/370.22 |
| 2013/0020040 A1 * | 1/2013 | Lin | B60J 1/2022 | 160/370.22 |
| 2016/0192791 A1 * | 7/2016 | Gao | A47G 1/14 | 40/714 |
| 2016/0193904 A1 * | 7/2016 | Sichart | B60J 7/0015 | 296/214 |
| 2017/0136855 A1 * | 5/2017 | Yasuda | B60J 1/2013 | |
| 2017/0368917 A1 * | 12/2017 | Seel | B60J 1/2019 | |
| 2017/0368918 A1 * | 12/2017 | Seel | B60J 1/2019 | |

FOREIGN PATENT DOCUMENTS

| | | | | |
|---|---|---|---|---|
| DE | 10 2007 016 154 A1 | | 9/2008 | |
| DE | 102011006994 A1 | * | 4/2012 | ............ B60J 1/2033 |
| DE | 102014001991 A1 | * | 8/2015 | ............ B60J 1/2022 |
| DE | 102016222354 A1 | * | 5/2017 | ............ B60J 1/2013 |
| DE | 102016111168 A1 | * | 12/2017 | ............ B60J 1/2025 |
| EP | 0601454 A1 | * | 6/1994 | ............ B60J 1/2022 |
| EP | 1897714 B2 | * | 5/2015 | ............ B60J 1/2022 |
| KR | 20090029663 A | * | 3/2009 | ............ B60J 1/2044 |

* cited by examiner

F I G. 1 2
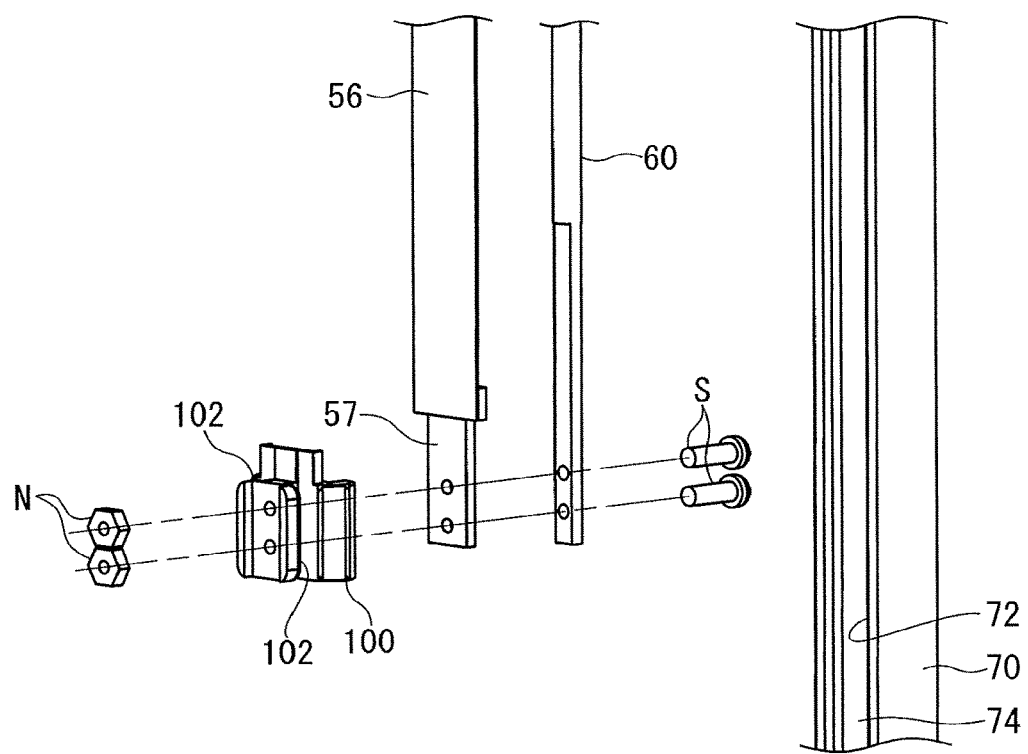

SHADE DEVICE FOR VEHICLE

BACKGROUND OF THE INVENTION (1) Field of the Invention

The present invention relates to a shade device to be mounted on a vehicle such as an automobile.

(2) Description of Related Art

DE 102007016154 A1 discloses a configuration of a roller blind for a window. According to this configuration, a free edge of the roller blind is connected to a pull rod, and the pull rod is guided by a support rod during extraction and retraction of the roller blind. The roller blind of DE 102007016154 A1 is biased in the extracting direction by force of a spiral spring in a spring motor.

The spring motor disclosed in DE 102007016154 A1 generates the extracting force for extracting the roller blind by restoring force of the spiral spring returning from a state wound with a reduced diameter to an original state. In this case, when the roller blind is extracted by the spring motor, the extraction force is large at a start of movement of the roller blind (i.e., a rotation initial stage of the spring motor). However, the extraction force decreases as extraction of the roller blind develops (i.e., a rotation late stage of the spring motor). For allowing extraction of the roller blind by the force of the spring motor even after large extraction of the roller blind, the spring motor to be used is required to generate large extraction force in a state of large extraction of the roller blind. When such a spring motor is used, however, biasing force of the spring motor becomes excessively large at the start of movement of the roller blind. As a result, the completely extracted roller blind extracted with large force comes into violent contact with an upper edge portion of a window. This contact may generate large noise and give discomfort to an occupant of a vehicle.

Accordingly, an object of the present invention is to realize extraction of a shade with appropriate force.

SUMMARY OF THE INVENTION

For achieving the above object, a first aspect is directed to a shade device for a vehicle, including: a shade deployed to shade a window of the vehicle in a deploying state, and stored in a stored state; a retracting mechanism attached to a base end of the shade and retracts the shade in the stored state; a stay attached to a tip end of the shade; an extractable constant force spring; a rod, its tip end portion being attached to the stay and its base end portion being connected to the constant force spring, biased in a deploying direction of the shade by biasing force of the constant force spring, and transmitting the biasing force to the stay; a guide rail that stores the rod and an extracted portion of the constant force spring in the stored state of the shade, and guides the rod when the shade shifts from the stored state to the deploying state; and a locking mechanism locks of the rod in the stored state.

A second aspect is directed to the shade device for a vehicle according to the first aspect, wherein the constant force spring is wound in a coil shape around a supporting member in the deploying state, a portion of the constant force spring is extracted within the guide rail and is waved in an arch shape in the stored state of the shade, and the rod is facing to on the outer surface of the portion of the constant force spring within the guide rail.

According to the shade device of the first aspect, the shade is retracted by the retracting mechanism in the stored state. The rod is biased by the constant force spring in a direction of moving the shade in the deploying state. This stored state is maintained by the locking mechanism that locks the movement of the rod. In the stored state, the constant force spring is curled in an original state and generates force for biasing the rod in the deploying direction of the shade by restoring force of the constant force spring returning from an expanded state to the original state. The expanded constant force spring in this state tends to be waved, but is not largely waved since the constant force spring is within the guide rail.

When the locking mechanism is unlocked, the rod moves in the deploying direction of the shade by biasing force of the constant force spring. Simultaneously, the stay attached to the tip end portion of the rod also moves in the deploying direction of the shade, whereby the shade comes into the deploying state extracted from the retracting mechanism. The biasing force of the constant force spring is kept substantially constant regardless of the extracted amount. Accordingly, the rod is movable with appropriate force necessary for extracting the shade from the retracting mechanism in all stages of extraction of the shade. In this case, the rod and the extracted portion of the constant force spring are stored within the guide rail. Accordingly, the rod and the extracted portion of the constant force spring are movable while guided within the guide rail; therefore, the biasing force of the constant force spring is efficiently transmitted to the rod.

For shifting the shade from the deploying state to the stored state, the stay is moved toward the retracting mechanism by operational force or the like of an occupant to retract and store the shade by the retracting mechanism. More specifically, force in a retracted direction opposite to the biasing force direction of the constant force spring is applied to the stay and other portions by operational force or the like of the occupant to move the stay and the rod to positions in the stored state.

As described above, the biasing force of the constant force spring for generating force to bias the rod in the deploying direction of the shade is substantially constant regardless of the extracted amount of the shade. Accordingly, the rod is movable with appropriate force necessary for extracting the shade from the retracting mechanism in all stages of extraction of the shade. Accordingly, force (acceleration) at a start of extraction of the shade or other occasions is allowed to decrease. Moreover, the biasing force of the constant force spring is efficiently transmitted to the rod. In this case, the biasing force generated by the constant force spring is allowed to decrease to the smallest possible force. Accordingly, extraction of the shade with appropriate force is achievable.

According to the second aspect, the rod within the guide rail is facing to the outer surface of the constant force spring at the portion extracted within the guide rail. In this case, the constant force spring at the portion waved in an arch shape within the guide rail in the stored state of the shade comes into contact with the rod at a portion close to the supporting member, and presses the rod against the inner surface of the guide rail. In addition, the base end portion of the rod is connected to the tip end portion of the constant force spring, and therefore pressed against the inner surface of the guide rail by the tip end portion of the constant force spring. As a result, the rod at the position close to the supporting member and at the position of the base end portion is pressed toward the inner surface of the guide rail. Accordingly, vibrations of the rod within the guide rail in accordance with vibrations given during traveling of the vehicle, and noise generated by the vibrations are allowed to decrease.

When the rod moves in the deploying direction of the shade, the constant force spring restores to a coil shape while maintaining the state pressed against the position of the rod. Accordingly, sliding noise is difficult to produce at the contact portion between the constant force spring and the rod.

BRIEF DESCRIPTION OF THE DRAWINGS

FIG. 12 is an exploded perspective view illustrating a portion connecting the constant force spring and the rod.

DETAILED DESCRIPTION OF PREFERRED EMBODIMENT

A shade device for a vehicle according to an embodiment will be described below.

General Configuration

Figure 1:
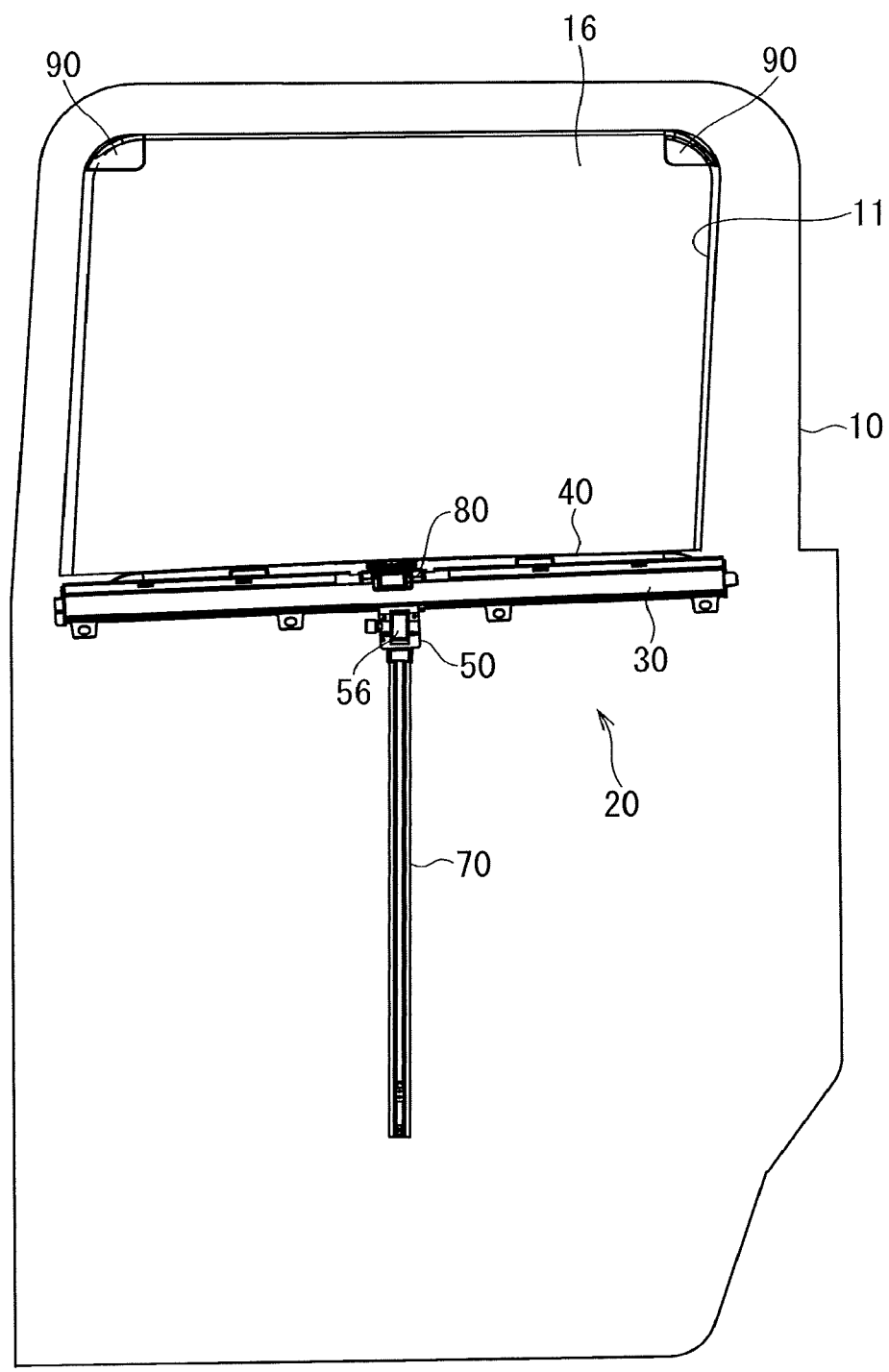
FIG. 1 is a side view illustrating a shade device for a vehicle, in a stored state.
Figure 2:
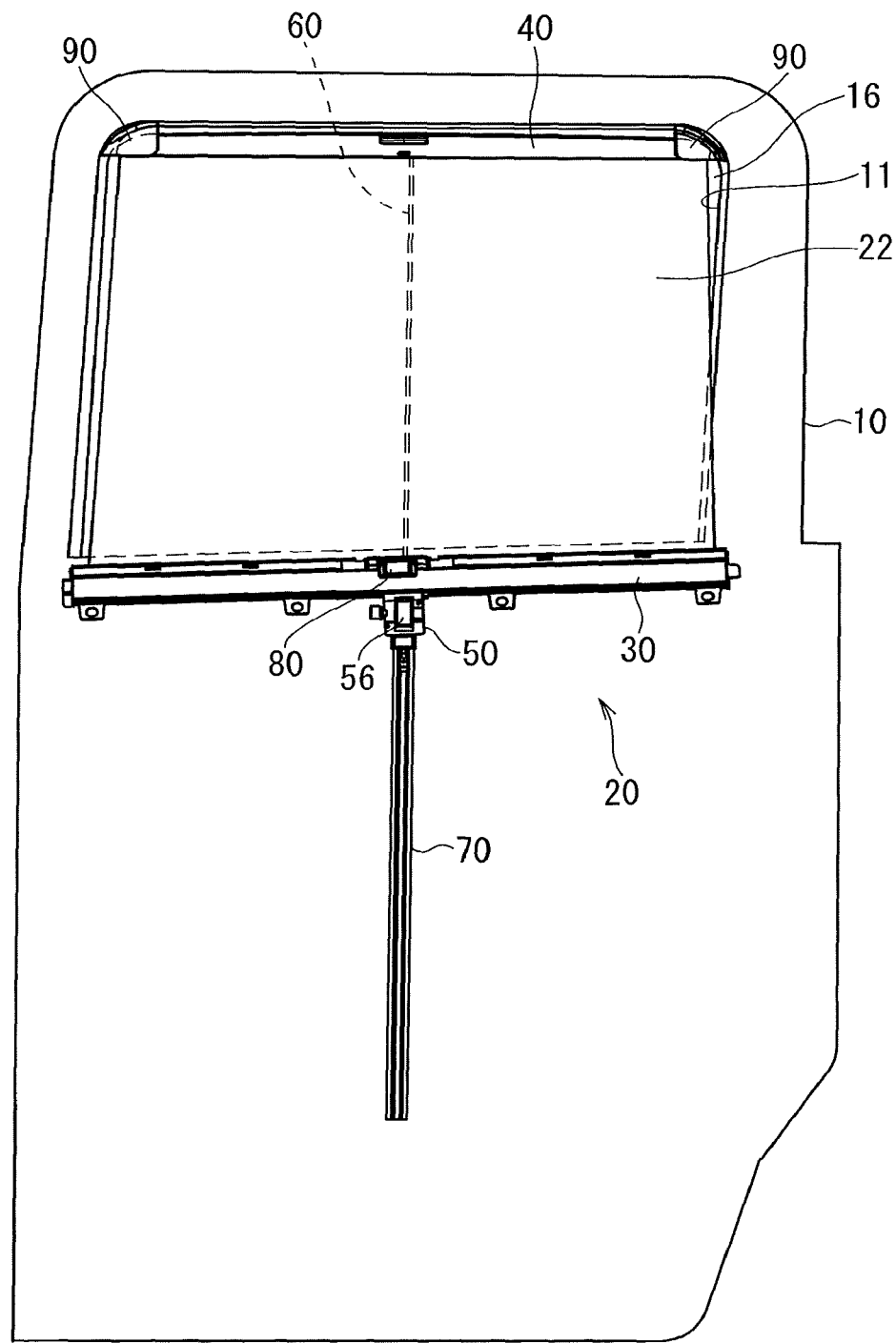
FIG. 2 is a side view illustrating the shade device in a deploying state.
Figure 3:
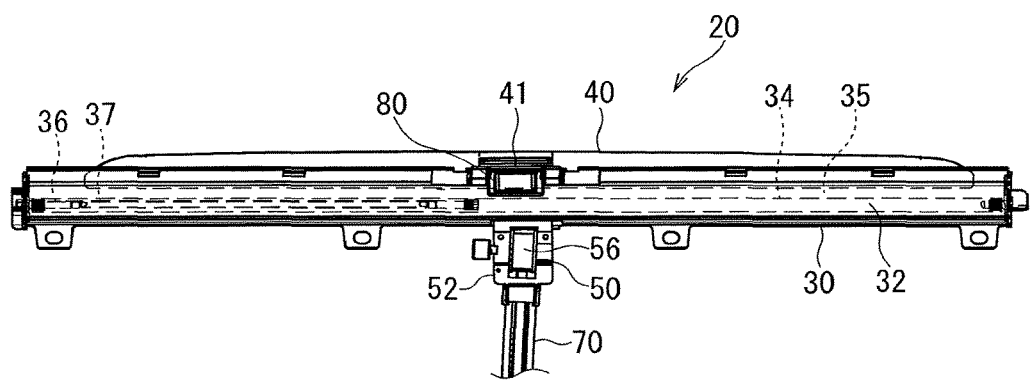
FIG. 3 is a partially enlarged side view illustrating the shade device in the stored state.
Figure 4:
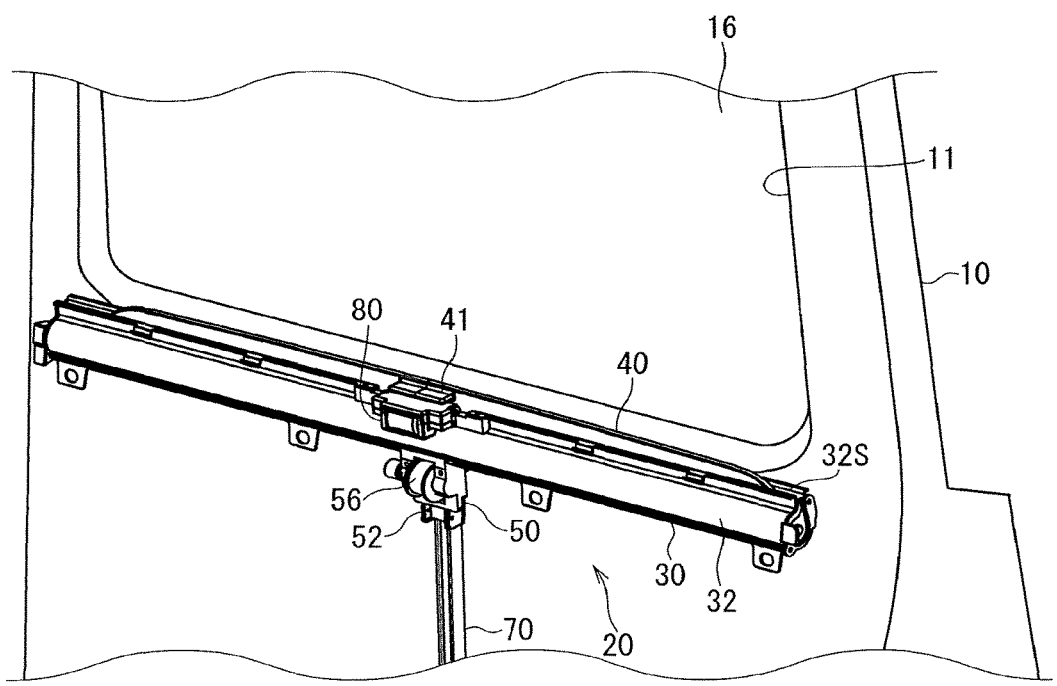
FIG. 4 is a partially enlarged perspective view illustrating the shade device in the stored state.
Figure 5:
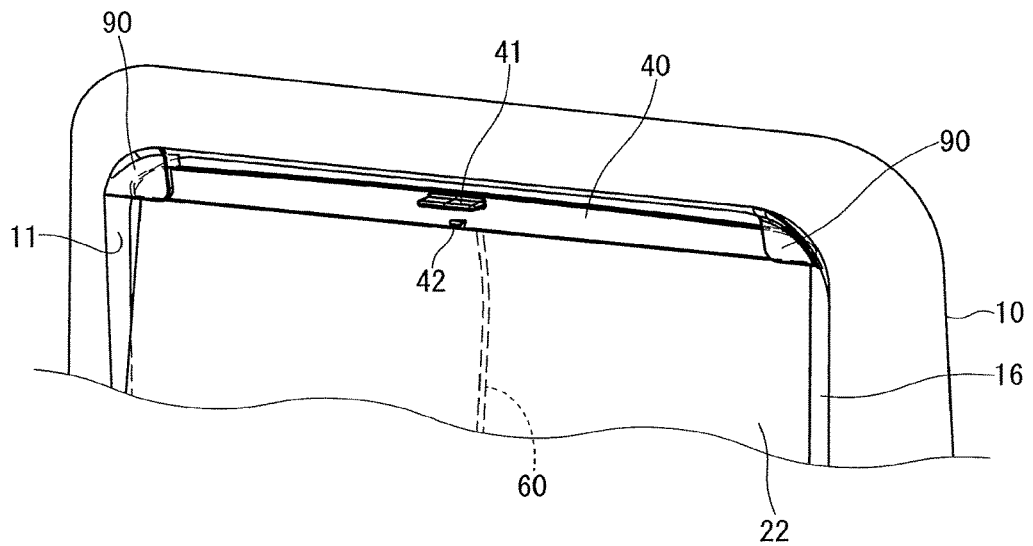
FIG. 5 is a partially enlarged perspective view illustrating the shade device in the deploying state.

FIG. 1 is a side view illustrating a shade device 20 in a stored state. FIG. 2 is a side view illustrating the shade device 20 in a deploying state. FIG. 3 is a partially enlarged side view illustrating the shade device 20 in the stored state. FIG. 4 is a partially enlarged perspective view illustrating the shade device 20 in the stored state. FIG. 5 is a partially enlarged perspective view illustrating the shade device 20 in the deploying state. FIGS. 1, 2, 4, and 5 each illustrate a state of the shade device 20 attached to a rear-side door 10 of the vehicle.

The shade device 20 is configured to cover a window 16 of the vehicle such as an automobile so as to shade and open or close the window 16. Discussed herein is an example of the shade device 20 covering the window 16 of the rear-side door 10. Note that the shade device 20 is applicable to a side window, a rear window, and the like provided on a vehicle body such as a trunk side.

The rear-side door 10 is a plate-shaped member that covers space for an occupant to get on and off a rear seat of the automobile, so as to open and close the space. The rear-side door 10 has an opening 11 in its upper part, and the window 16 covers the opening 11 in an openable and closable manner. According to this example, the window 16 has a rectangular shape. However, the window 16 may have other shapes, such as a shape whose height gradually lowers toward the rear of the vehicle.

The shade device 20 is assembled into a trim portion extending along a lower edge portion of the window 16. A shade 22 is extracted from the lower edge portion of the window 16 along the side surface of the window 16 in the interior of the vehicle to shade the window 16, in the deploying state of the shade device 20. On the other hand, when the shade 22 is stored below the window 16, the window 16 comes into a state not shaded from light by the shade 22, in the stored state of the shade device 20. The shade device 20 is not required to deploy in the direction from the lower edge portion to the upper edge portion of the window 16, but may deploy in the direction from the upper edge portion to the lower edge portion of the window, or in the direction from one side to the other side of the window, for example.

The shade device 20 includes the shade 22, a retracting mechanism 30, a stay 40, a biasing mechanism 50 for deploying the shade 22, a rod 60, a guide rail 70, and a locking mechanism 80.

A general schematic configuration of the shade device 20 is now described. The shade 22 is retracted by the retracting mechanism 30, and the stay 40 is attached to a tip of the shade 22 in the deploying direction. The rod 60 is supported by the guide rail 70 so as to be movable in the deploying (extracted) and storing (retracted) directions of the shade 22. A tip portion of the rod 60 is attached to the stay 40. A constant force spring 56 of the biasing mechanism 50 generates force for biasing the shade 22 in the deploying direction. This biasing force generated by the constant force spring 56 is transmitted to the stay 40 via the rod 60. The locking mechanism 80 is configured to lock the shade 22 in the stored state of the shade 22 retracted by the retracting mechanism 30.

In the stored state, the shade 22 is being retracted by the retracting mechanism 30. The stored state is maintained by the locking mechanism 80 (see FIGS. 1, 3, and 4). In this state, the biasing force of the constant force spring 56 is more than the biasing force generated by the retracting mechanism 30. Accordingly, the shade 22 deploys with the biasing force of the constant force spring 56 when the locking mechanism 80 is unlocked. As a result, the shade device 20 comes into the deploying state (see FIGS. 2 and 5).

The stay 40 in the foregoing deploying state is lowered by, for example, a hand of an occupant. In accordance with this lowering, the shade 22 is retracted by the retracting mechanism 30. When the tip of the shade 22 reaches the lower edge portion of the window 16, the stay 40 is locked by the locking mechanism 80. As a result, the shade device 20 comes into the stored state.

Configurations of Respective Units

Configurations of respective units of the shade device 20 will be described below.

As illustrated in FIGS. 1 to 5, the shade 22 is a member for shading the window 16. The shade 22 is a sheet-shaped member formed of a material such as a meshed cloth and a resin sheet and produced by cutting and sewing the material. More specifically, the shade 22 has substantially the same size and shape as those of the window 16 to be shaded, so as to entirely shade the window 16. The shade 22 may have such a shape and a size as to shade a part of the window 16 to be shaded, or may have such a shape and size to shade all of a plurality of windows.

A base end of the shade 22 is attached to the retracting mechanism 30. The shade 22 is retracted by the retracting mechanism 30 in the stored state. More specifically, the retracting mechanism 30 includes a retracting shaft 34 rotatably supported within a long and narrow case 32 (see FIG. 3). The retracting shaft 34 constantly generates biasing force in a direction of retracting the shade 22.

According to this example, the retracting shaft 34 includes a pipe-shaped shaft main body portion 35, a one-sided support shaft 36, and a torsion coil spring 37 (see FIG. 3). The one-sided support shaft 36 is rotatably attached into one end portion of the pipe-shaped shaft main body portion 35. One end portion of the torsion spring coil 37 provided for generating retraction bias is connected to the shaft main body portion 35 in a state not rotatable relative to the shaft main body 35, and the other end portion of the torsion coil spring 37 is connected to the one-sided support shaft 36 in a state not rotatable relative to the one-sided support shaft 36. The other end portion of the shaft main body portion 35 is rotatably supported on one end portion of the case 32, and an outside end portion of the one-sided support shaft 36 is supported on the other end portion of the case 32 in a state not rotatable relative to the case 32.

A base end portion of the shade 22 is connected to the shaft main body portion 35 in a state not rotatable relative to the shaft main body portion 35. The base end portion of the shade 22 is a portion corresponding to the lower edge portion of the window 16. The shade 22 is retracted around the shaft main body portion 35, and extracted to the outside through a slit 32S formed in a part of the outer circumference of the case 32 (see FIG. 4).

In an extracted state of the shade 22, the shaft main body portion 35 rotates relative to the one-sided support shaft 36 and twists the torsion coil spring 37. In this state, the torsion coil spring 37 generates force for returning to an original state, thereby constantly generating retracting force for retracting the shade 22 around the retracting shaft 34. The torsion coil spring 37 may be replaced with flat spiral springs, a constant force spring, or other springs.

The stay 40 is a member attached to a tip of the shade 22. According to this example, the stay 40 is formed of an elongated member made of resin or the like. The tip of the shade 22 corresponds to a tip extracted from the retracting mechanism 30 in the extracting direction of the shade 22, and located at an upper edge portion of the window 16 in the deploying state. It is preferable that the stay 40 is provided throughout the tip edge portion of the shade 22 for preventing generation of wrinkles or the like in the shade 22 in the deploying state. However, the stay 40 is not required to extend throughout the tip edge portion of the shade 22.

A knob 41 protrudes from the side portion of the stay 40 on the side facing the inside of the interior of the vehicle. According to this example, the knob 41 is provided at an intermediate portion of the stay 40 in the extending direction. This structure allows the occupant or the like to easily operate the stay 40, particularly at the time of lowering the stay 40, by holding the knob 41.

Figure 6:
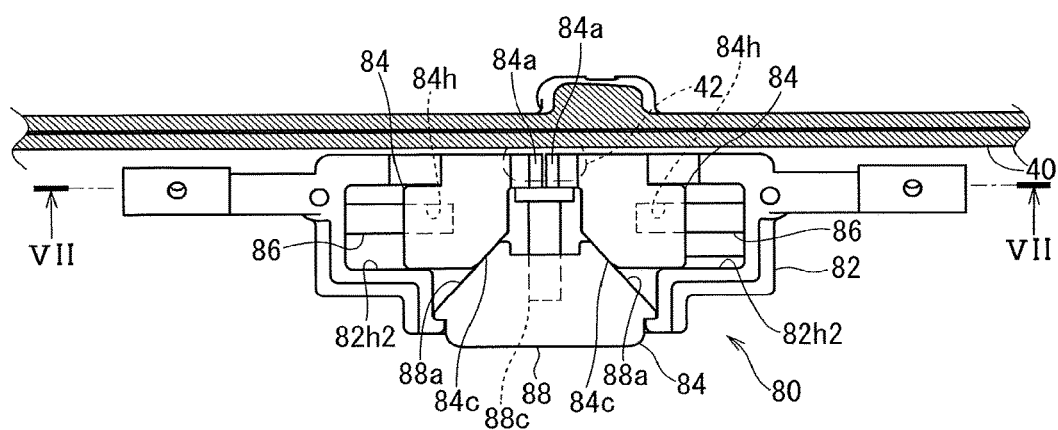
FIG. 6 is a schematic horizontal sectional view illustrating a locking protrusion engaging with a locking mechanism.
Figure 7:
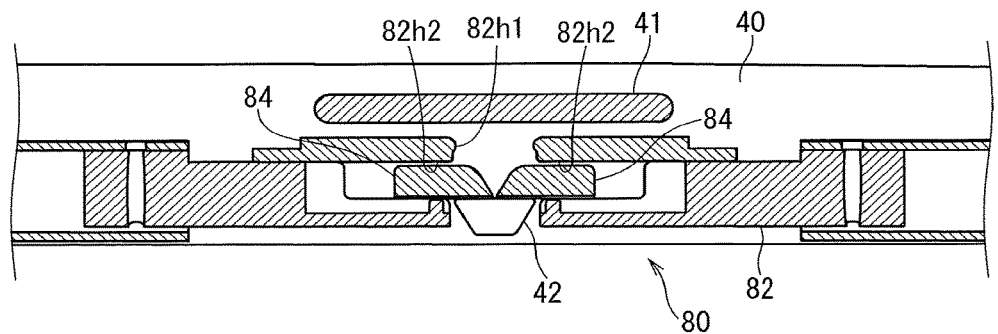
FIG. 7 is a schematic sectional view taken along a line VII-VII in FIG. 6.

A locking protrusion 42 is further provided on the stay 40 (see FIG. 5). According to this example, the locking protrusion 42 is provided below the knob 41 at an intermediate portion of the stay 40 in the extending direction. As illustrated in FIGS. 6 and 7, the locking protrusion 42 is configured to engage with and disengage from the locking mechanism 80 to maintain the stored state of the shade device 20 by engagement with the locking mechanism 80.

The locking projection 42 and the locking mechanism 80 are now described. The locking mechanism 80 is provided below the locking projection 42 in a retracted state of the shade 22 by the retracting mechanism 30. According to this example, the locking mechanism 80 is provided on one outward side of the case 32 and at an intermediate portion of the case 32 of the retracting mechanism 30 in the extending direction. The locking mechanism 80 is so disposed that the locking projection 42 comes to a position engaging with the locking mechanism 80 when the stay 40 reaches a position in contact with the outside of the slit 32S of the case 32 in the retracted state of the shade 22 by the retracting mechanism 30.

This configuration is more specifically described with reference to FIGS. 6 to 9. The locking protrusion 42 is a protrusion provided at a portion on one outward side of the stay 40. The locking protrusion 42 is located on the storage side with respect to the knob 41, and so shaped as to protrude toward the portion on one outward side of the stay 40. Both side surfaces of the locking protrusion 42 are inwardly inclined in the storing direction of the shade 22 (downward) (see FIG. 7).

The locking mechanism 80 configured to engage with and disengage from the locking protrusion 42 prevents a shift of the rod 60 in the stored state by engagement with the locking protrusion 42. According to this example, the locking mechanism 80 includes a locking housing 82, movable locking members 84, and coil springs 86 functioning as a biasing member.

The locking housing 82 is a member made of resin or the like, and supports the movable locking members 84 such that the movable locking members 84 are movable between an engagement position and a disengagement position. The movable locking members 84 move to the engagement position and engage to the locking projection 42, thereby cannot move in the deploying direction. The movable locking members 84 move to the disengagement position and release the engagement to the locking protrusion 42, thereby the stay 40 can move upward.

More specifically, the locking housing 82 is a member attached to one side of the case 32. The locking housing 82 includes an insertion hole 82*h*1 extending in the direction from the deploying state to the stored state of the shade 22 (direction from above to below). When the stay 40 moves to a vicinity of the outside of the slit 32S of the case 32 by the shade 22 which is retracted to the stored state, the locking projection 42 enters the insertion hole 82*h*1 from above.

A pair of movable spaces 82*h*2 are formed in the locking housing 82 on one and the other sides of the insertion hole 82*h*1, respectively, to store the movable locking members 84 such that the movable locking members 84 are movable. The pair of the movable spaces 82*h*2 connect with the insertion hole 82*h*1. The pair of movable locking members 84 are movably supported within the pair of movable spaces 82*h*2. Locking projections 84*a* are capable of stopping the locking protrusion 42 and are provided on facing portions of the pair of movable locking members 84. The facing portions of the pair of engaging projections 84*a* are so shaped as to gradually open toward the outside in the deploying direction of the shade 22. Accordingly, both the side surfaces of the locking protrusion 42 slidingly contact to the facing portions of the pair of engaging projections 84a and move a pair of holding members 90 in a direction away from each other, when the locking protrusion 42 comes into a space between the pair of movable locking members 84.

Coil attachment holes 84h are provided in the outward portions of the pair of movable locking members 84. The coil spring 86 attached to the coil attachment holes 84h is pressed against outer surfaces within the movable spaces 82h2. Biasing force of the coil spring 86 provided in this condition biases the pair of movable locking members 84 in a direction moving close to each other.

Figure 8:
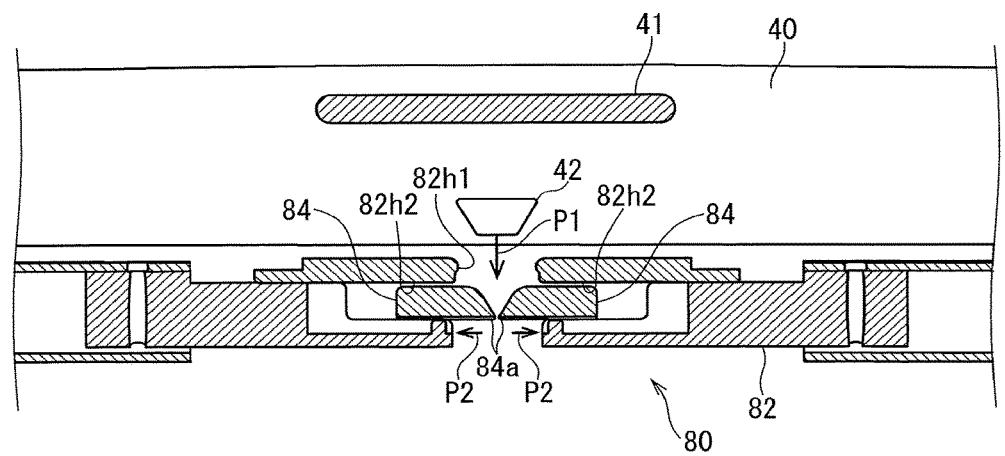
FIG. 8 is a view illustrating a state prior to the engagement between the locking protrusion and the locking mechanism in FIG. 7.
Figure 9:
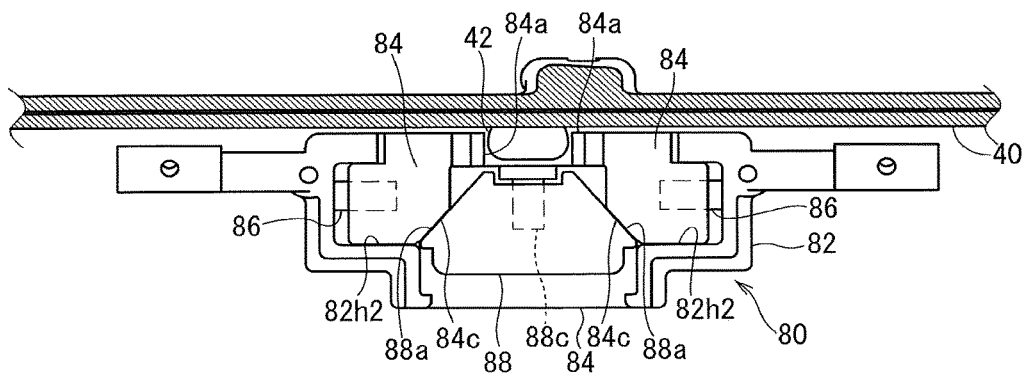
FIG. 9 is a view illustrating a pressed state of an unlocking operation unit in FIG. 6.

The engagement position discussed above is a position in a state that the locking projections 84a of the pair of movable locking members 84 protrude into the insertion hole 82h1 by the biasing force of the coil spring 86 (see FIGS. 6 to 8). On the other hand, the disengagement position is a position in a state that the engaging projections 84a of the pair of movable locking members 84 move outward in directions away from the insertion hole 82h1 while resisting the biasing force of the coil spring 86, and produce a space between the locking projections 84a to allow passage of the locking protrusion 42 (see FIG. 9) through the space.

On the other hand, an unlocking inclined surface 84c is provided at each of facing portions of the pair of movable locking members 84 facing the interior of the vehicle. The unlocking inclined surfaces 84c gradually open outward toward the inside of the interior of the vehicle. An unlocking operation unit 88 is provided between the pair of unlocking inclined surfaces 84c. The unlocking operation unit 88 includes pressing surfaces 88a each of which faces the corresponding the pair of unlocking inclined surfaces 84c. The interior side portion of the unlocking operation unit 88 is provided on the interior of the vehicle and opposed to the case 32 and is exposed from the locking housing 82 to be pressed by the finger or the like of the occupant. The unlocking operation unit 88 is supported by a coil spring 88c below the pair of engaging projections 84a in such a manner as to be movable close to and away from the stay 40. In a state that the pair of movable locking members 84 are moved to the engagement position, the pair of unlocking inclined surfaces 84c come into contact with the pair of pressing surfaces 88a to press the unlocking operation unit 88 in the direction away from the stay 40. When the unlocking operation unit 88 in the foregoing state is pressed, the pair of pressing surfaces 88a press the pair of unlocking inclined surfaces 84c to move the pair of movable locking members 84 in the direction away from each other while resisting the biasing force of the coil spring 86. As a result, the pair of movable locking members 84 shift to the disengagement position (see FIG. 9).

Operation of the locking mechanism 80 is now described. In the deploying state of the shade 22, the pair of movable locking members 84 are biased toward the engagement position by the biasing force of the coil spring 86 (see FIG. 8). When the occupant or the like lowers the stay 40 in this state, the locking protrusion 42 approaches a position above the space between the pair of movable locking members 84 (see FIG. 8). When the stay 40 is further lowered (see arrow P1), both side portions of the locking protrusion 42 slidingly contact to the facing portions of the pair of movable locking members 84, and move the pair of movable locking members 84 to the disengagement position while resisting the biasing force of the coil spring 86. As a result, the locking protrusion 42 is allowed to pass through the space between the pair of movable locking members 84, and shift to a position below the movable locking members 84. When the locking protrusion 42 shifts to the position below the pair of movable locking members 84, the pair of movable locking members 84 return to the original engagement positions by the biasing force of the coil spring 86. In this condition, an upper portion of the locking protrusion 42 contacts lower portions of the engaging projections 84a of the pair of movable locking members 84, whereby the locking protrusion 42 comes into a state unable to move upward (see FIGS. 6 and 7). As a result, upward movements of the stay 40 and the rod 60 are prevented, whereby the stored state of the shade 22 is maintained.

When the unlocking operation unit 88 is pressed in this state, the pair of pressing surfaces 88a press the pair of unlocking inclined surfaces 84c and move the pair of movable locking members 84 to the disengagement position. In this case, a clearance is produced between the pair of locking projections 84a to allow passage of the locking protrusion 42; therefore, the locking protrusion 42 is allowed to pass between the pair of locking projections 84a and shift upward therethrough. When the force pressing the unlocking operation unit 88 is released in a subsequent stage, the pair of movable locking members 84 return to the engagement position by the biasing force of the coil spring 86. In addition, the stay 40 shifts to come into the deploying state by the biasing force of the biasing mechanism 50. Accordingly, the shade 22 is extracted in accordance with the shift of the stay 40.

Figure 10:
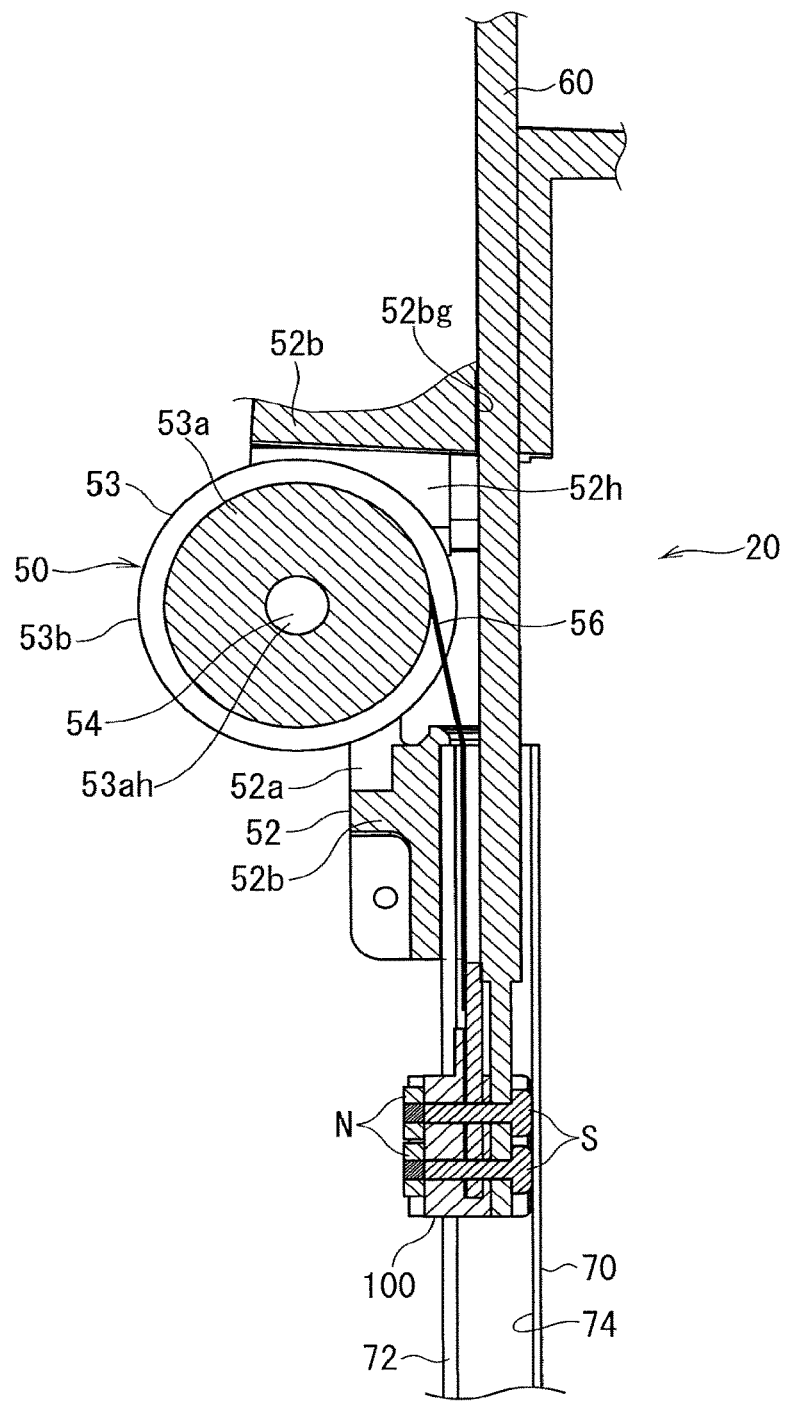
FIG. 10 is a sectional view illustrating a portion combining a constant force spring, a rod, and a guide rail.
Figure 11:
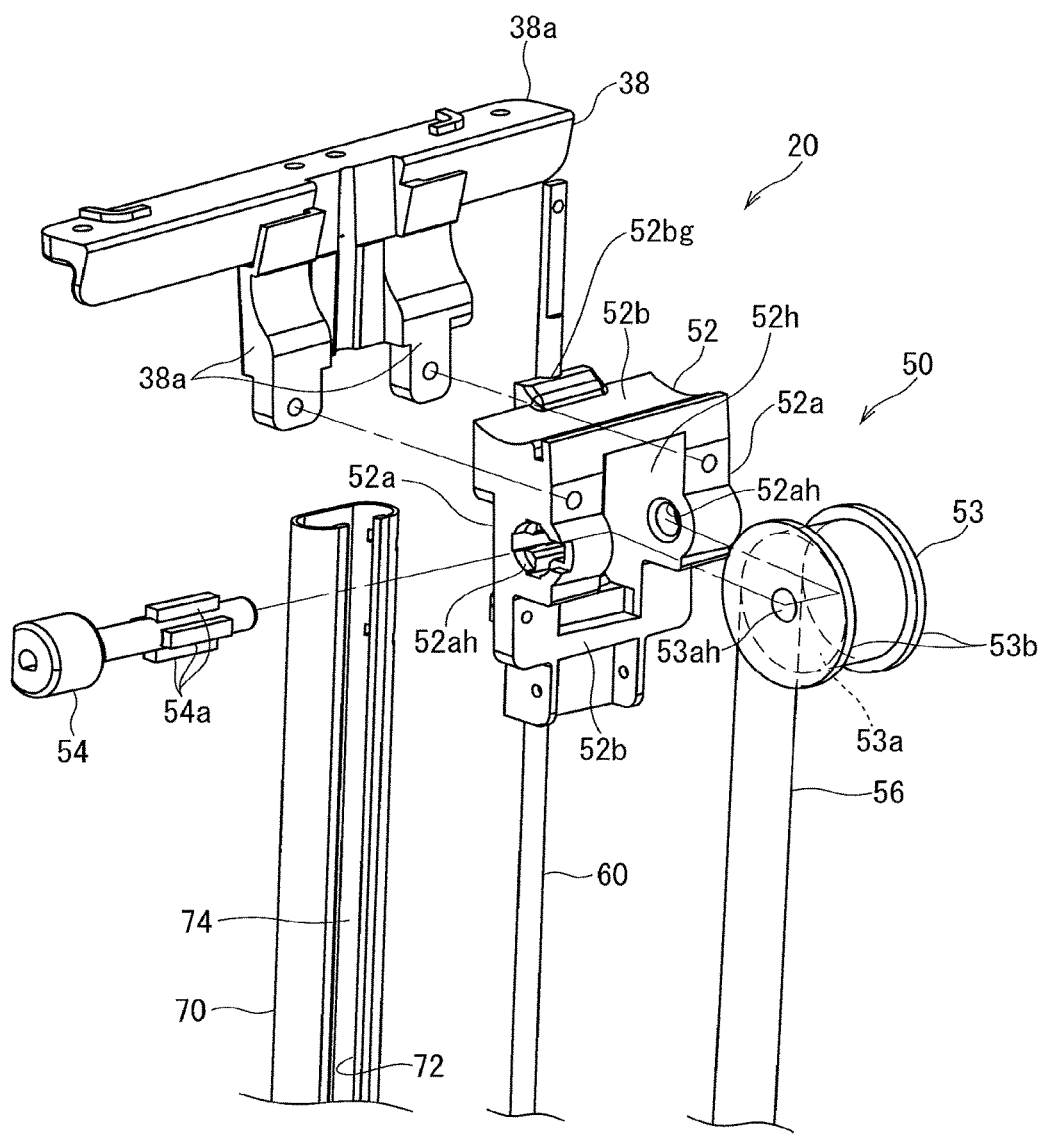
FIG. 11 is an exploded perspective view illustrating the portion combining the constant force spring, the rod, and the guide rail.

FIG. 10 is a sectional view illustrating a part combining the constant force spring 56, the rod 60, and the guide rail 70. FIG. 11 is an exploded perspective view illustrating the part combining the constant force spring 56, the rod 60, and the guide rail 70. FIG. 12 is an exploded perspective view illustrating a part connecting the constant force spring 56 and the rod 60.

As illustrated in FIGS. 1 to 4 and FIGS. 10 to 12, the rod 60 is an elongated member made of metal or resin, for example. The rod 60 has a larger length than the length of the window 16 in the up-down direction. A tip portion of the rod 60 is attached to the stay 40. According to this example, the tip portion of the rod 60 is connected to an intermediate portion of the stay 40 in the extending direction, and in a vertical posture with respect to the stay 40. Accordingly, the rod 60 extends downward from the intermediate portion of the stay 40 in the extending direction. According to this example, the rod 60 is so disposed as to pass through the outward surface of the interior of the vehicle with respect to the shade 22. The rod 60 may be disposed to pass through the interior side of the vehicle with respect to the shade 22.

The guide rail 70 is located below the retracting mechanism 30 and configured to guide the rod 60 in the deploying direction of the shade 22. More specifically, the guide rail 70 is a cylindrical member made of metal or resin, for example. According to this example, the guide rail 70 has a square tube shape. The guide rail 70 may have other shapes such as a polygonal tube shape and a cylindrical shape. The guide rail 70 includes a slit 72 extending in the extending direction of the guide rail 70. The slit 72 may be eliminated. An upper end portion of the guide rail 70 is connected to an intermediate portion of the retracting mechanism 30 in the extending direction, and configured to extend downward from the intermediate portion of the retracting mechanism 30 in the extending direction. According to this example, a base member 52 (described below) is attached to a lower part of the intermediate portion of the case 32 in the extending direction via a bracket 38. The upper end portion of the guide rail 70 is fixed to the base member 52 by screwing or other methods (see FIG. 11). The upper end portion of the guide rail 70 may be fixed to the case 32 via a bracket or the like. The guide rail 70 is not required to be attached to the retracting mechanism 30 directly or indirectly, but may be directly assembled to a metal panel portion of a backside door, or to a resin interior portion, for example.

The guide rail 70 contains a movable space 74 capable of storing the rod 60 and the constant force spring 56 of the biasing mechanism 50 described above in the extending direction of the guide rail 70. The movable space 74 has at least a length sufficient for storing the rod 60 extending downward from the stay 40 in the stored state of the shade device 20.

The rod 60 extends below the retracting mechanism 30 either in an extracted condition of the shade 22 in the deploying state, or in a stored condition of the shade 22 in the retracting mechanism 30 in the stored state. A downward extending portion of the rod 60 from the retracting mechanism 30 is set in the guide rail 70 through an upper side opening of the guide rail 70. The downward extending portion of the rod 60 from the retracting mechanism 30 is movably set in the guide rail 70 to guide the rod 60 in the deploying direction of the shade 22. In other words, the rod 60 is guided by the guide rail 70 in accordance with movement of the shade 22 between the stored state and the deploying state.

The biasing mechanism 50 includes the extractable constant force spring 56. For generating biasing force, the constant force spring 56 utilizes restoring force of the constant force spring 56 wound in a spiral shape. This restoring force is generated when an outer surface side of the constant force spring linearly extracted returns to an original shape having an original radius of curvature. The constant force spring 56 thus constructed has such a characteristic that generated biasing force is constant regardless of an extracted amount. Accordingly, the biasing mechanism 50 is capable of generating substantially constant biasing force.

More specifically, the biasing mechanism 50 includes the base member 52, a reel 53, a supporting member 54, and the constant force spring 56.

The base member 52 is made of resin or metal, for example, and configured to support the constant force spring 56 such that a center axis of the constant force spring 56 is located at a fixed position. According to this example, the base member 52 includes a pair of spring support pieces 52a, and a pair of connection pieces 52b. Both end portions of the pair of spring support pieces 52a which are spaced each other are connected by the pair of connection pieces 52b. In this structure, a spring storage space 52h surrounded by the pair of spring support pieces 52a and the pair of connection pieces 52b is formed at a center portion of the base member 52.

A support shaft hole 52ah is provided at intermediate portion of each of spring support pieces 52a in the extending direction. The shaft-shaped supporting member 54 is inserted into the support shaft holes 52ah.

The upper end portion of the guide rail 70 is fixed to a bottom portion of an intermediate portion of the lower side connection piece 52b by screwing or other methods. In this condition, an upper side opening of the guide rail 70 opens toward the spring storage space 52h (see FIG. 10).

On the other hand, a guide groove 52bg for guiding the rod 60 is formed at an intermediate portion in a bottom portion of the upper side connection piece 52b.

The base member 52 is attached to a lower part of the intermediate portion of the case 32 in the extending direction via the bracket 38 (see FIGS. 10 and 11). The bracket 38 is a member made of resin or the like, and includes a fixed portion 38a fixed to the lower part of the intermediate portion of the case 32 in the extending direction by screwing or other methods, and a pair of extending pieces 38b extending downward from the fixed portion 38a. The pair of extending pieces 38b are fixed to upper end portions of the pair of spring support pieces 52a by screwing or other methods. In this condition, an upward extended portion of the rod 60 from the upper end portion of the guide rail 70 is guided upward through the guide groove 52bg between the pair of extended pieces 38b.

The reel 53 is a member made of resin or the like, and includes a cylindrical body portion 53a, and a pair of flange portions 53b expanded outward in the circumferential direction from both ends of the body portion 53a. A shaft insertion hole 53ah is formed at center of the body portion 53a to receive the supporting member 54 in the axial direction of the body portion 53a.

The constant force spring 56 is constituted by a band-shaped spring material, and wound around the reel 53 in a spiral shape. According to this example, the constant force spring 56 has a shape wound around the body portion 53a of the reel 53. The constant force spring 56 has at least a length equivalent to the length of the rod 60 in a state of deepest set into the guide rail 70 in the stored state. The constant force spring may be constituted by any spring as long as the spring has a coil shape wound to have a substantially constant radius of curvature, such as a spring wound in a spiral shape in a two-dimensional plane, or a spring wound in a helical shape extending in a predetermined axial direction while circulating in a cylindrical circumferential surface in a three-dimensional space.

The supporting member 54 is set into the support shaft holes 52ah and the shaft insertion hole 53ah in a state that the reel 53 is positioned between the pair of spring support pieces 52a. The supporting member 54 is rotatable at least in the pair of support shaft holes 52ah or in the shaft insertion hole 53ah. According to this example, rotation prevention projections 54a are provided at an intermediate portion of the supporting member 54 in the axial direction. Both end sides of the rotation prevention projections 54a are round-bar-shaped. The rotation prevention projections 54a are fitted to the shaft insertion hole 53ah in a rotation-prevented state, while each end side portion of the rotation prevention projections 54a is rotatably fitted to the corresponding one of the pair of support shaft holes 52ah. In this case, the reel 53 is supported rotatably around a fixed rotation axis with respect to the base member 52 in accordance with rotation of the supporting member 54 relative to the pair of support shaft holes 52ah. The reel 53 may be rotatable relative to the supporting member 54 in a state that the supporting member 54 is fitted to the support shaft holes 52ah without rotation relative to the support shaft holes 52ah. In addition, the constant force spring 56 wound in a coil shape may be rotatable relative to the supporting member 54 in a state that the constant force spring 56 is inserted into the supporting member 54 without using the reel 53. The constant force spring 56 is not required to be supported in the manners as described above. The constant force spring 56 may be stored in a rotatable manner within a predetermined section, and extracted through a slit extending from this space to the outside.

In the condition of the reel 53 supported in the manner as described above, the outside end portion of the constant force spring 56 wound around the reel 53 is extracted downward along a bottom surface of the base member 52, and guided into the guide rail 70 through the upper side opening of the guide rail 70 attached to the base member 52. Under the condition of the constant force spring 56 stored within the guide rail 70, the constant force spring 56 is not largely extracted with an excessively large curve. Particularly when the supporting member 54 is disposed at a position above the upper side opening of the guide rail 70, the extracted constant force spring 56 immediately comes into the guide rail 70. This structure allows storage of the largest possible portion of the entire constant force spring 56 within the guide rail 70, thereby reducing a large wave of the constant force spring 56. The support shaft may be provided at a certain distance from the guide rail. In addition, an opening for introducing a spring may be formed at an intermediate portion of the guide rail in the extending direction to introduce the spring into the intermediate portion of the guide rail 70 in the extending direction.

As described above, the base end portion (lower end portion) of the rod 60 and the outer surface-side tip portion of the constant force spring 56 are inserted through the upper side opening of the guide rail 70 and stored within the guide rail 70. The base end portion of the rod 60 is connected to the tip end portion of the constant force spring 56 within the guide rail 70. According to this example, the base end portion of the rod 60 has a flat shape to constitute two surfaces parallel with each other. A plate-shaped connection member 57 is fixed to the tip end portion of the constant force spring 56 by riveting or other methods. The base end portion of the rod 60 and the connection member 57 in a state overlapping with each other are connected to each other by using a screw S and a nut N. Connection between the base end portion of the rod 60 and the connection member 57 may be made by other methods such as riveting and welding.

According to this example, an in-rail movable member 100 is attached to the connection portion between the base end portion of the rod 60 and the connection member 57. The in-rail movable member 100 is a flat member made of resin or the like. It is preferable that the in-rail movable member 100 is so shaped as to be movable along the guide rail 70 without wobble. According to this example, the in-rail movable member 100 is configured to be movable along the guide rail 70 without wobble by engagement between both side edges of the slit 72 of the guide rail 70 and grooves 102 formed in both side portions of the in-rail movable member 100. The in-rail movable member 100 is similarly fixed to the base end portion of the rod 60 and the connection member 57 in a state overlapping with each other, via the screw S and the nut N or others.

The constant force spring 56 at a portion linearly extracted within the guide rail 70 is urged to return to the original spiral shape. More specifically, biasing force for upward movement within the guide rail 70 acts on the tip end portion of the constant force spring 56. The tip end portion of the constant force spring 56 and the base end portion of the rod 60 are connected to each other; therefore, the rod 60 is biased by the biasing force of the constant force spring 56 to move upward within the guide rail 70. The direction of upward movement of the rod 60 is identical to the deploying direction of the shade 22. Accordingly, the rod 60 is biased in the deploying direction of the shade 22 by the biasing force of the constant force spring 56. The tip portion of the rod 60 is connected to the stay 40; therefore, the rod 60 transmits the biasing force to the stay 40.

Figure 13:
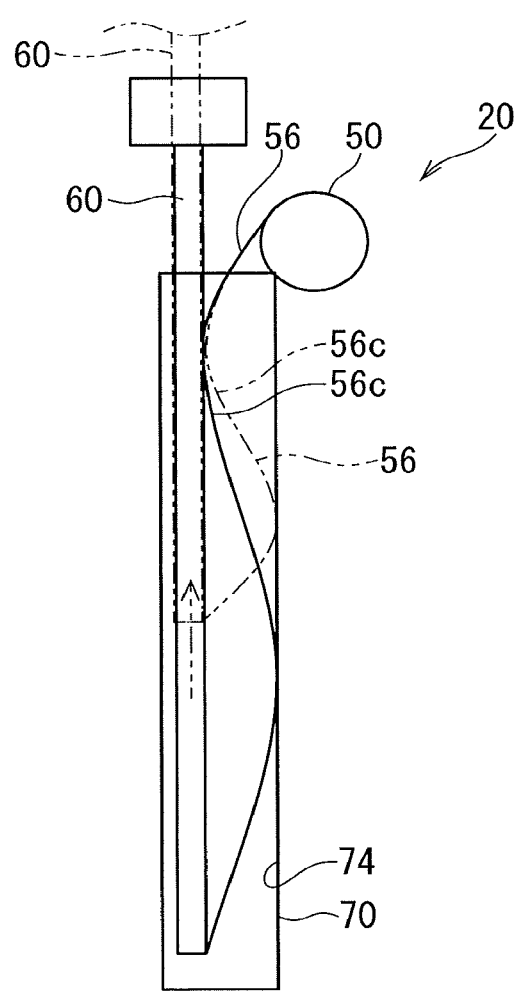
FIG. 13 is an explanatory view illustrating a positional relationship between the rod and the spring within the guide rail in the stored state, and conditions of the rod and the spring.

A positional relationship between the rod 60 and the constant force spring 56 within the guide rail 70, and others are described below. FIG. 13 is an explanatory view illustrating the positional relationship between the rod 60 and the constant force spring 56 within the guide rail 70, and conditions of the rod 60 and the constant force spring 56, in the stored state.

In the deploying state, the constant force spring 56 is wound around the supporting member 54 in a spiral shape as described above. In the stored state, however, a major part of the base end of the rod 60 and a major part of the outer surface-side end portion of the constant force spring 56 are within the guide rail 70. In this state, the constant force spring 56 at the portion extracted within the guide rail 70 is waved in an arch shape. In other words, the constant force spring 56 and the rod 60 are located adjacent to each other while stored within the guide rail 70. The constant force spring 56 at a portion not extracted but kept wound (the constant force spring 56 at a portion kept wound around the reel 53) is located on the side opposite to the rod 60. The original shape of the constant force spring 56 is a bent and wound shape; therefore, the constant force spring 56 introduced into the guide rail 70 contacts the rod 60 while waved in an arch shape bowed toward the rod 60. The tip portion of the constant force spring 56 is connected to the base end portion of the rod 60. In this structure, the constant force spring 56 coming into contact with the rod 60 is gradually waved toward the opposite side, while the tip end portion of the constant force spring 56 approaches the base end portion of the rod 60. Accordingly, the constant force spring 56 at the portion extracted within the guide rail 70 is gradually waved in an S shape within the guide rail 70. The rod 60 in this condition is facing to the outer surface of the constant force spring 56. The outer surface side of the constant force spring 56 in this context refers to the surface facing the outer circumferential side in the wound state of the constant force spring 56. In this case, the rod 60 is pressed in one direction by the constant force spring 56 at a portion 56c waved in an arch shape within the guide rail 70. Accordingly, the rod 60 is difficult to produce backlash within the guide rail 70. Particularly, in comparison with other portions of the constant force spring 56, the portion 56c curved in an arch shape protrudes toward the rod 60 most easily in the upper region of the guide rail 70; therefore, the constant force spring 56 presses the rod 60 toward the inner surface of the guide rail 70 in the upper region of the guide rail 70. This structure effectively prevents wobble of the rod 60 in the upper region of the guide rail 70. The base end portion of the rod 60 is connected to the tip end portion of the constant force spring 56, and therefore pressed toward the inner surface of the guide rail 70 by the tip end portion of the constant force spring 56. Accordingly, the base end portion of the rod 60 is similarly difficult to produce wobble. The in-rail movable member 100 described above similarly reduces wobble at the base end portion of the rod 60.

Moreover, the constant force spring 56 restores to the wound state while maintaining the state pressed against a fixed portion of the rod 60 at the time of movement of the rod 60 in the deploying direction of the shade 22 (see constant force spring 56 and rod 60 indicated by alternate long and two short dashes lines in FIG. 13). Accordingly, sliding noise is difficult to generate from the contact portion between the constant force spring 56 and the rod 60.

Operation of Shade Device

Operation of the shade device will be described below.

In the stored state, the shade 22 is retracted by the retracting mechanism 30. This state is maintained by the locking mechanism 80 (see FIGS. 1, 3, and 4). In this condition, the constant force spring 56 is waved in an S shape within the guide rail 70 as described above. Accordingly, the portion 56c waved in an arch shape presses the rod 60 against the inner surface of the guide rail 70. Moreover, the tip portion of the rod 60 is supported by the in-rail movable member 100 without wobble. Accordingly, wobble of the rod 60 within the guide rail 70 is decreased.

When the locking mechanism 80 is unlocked in the stored state, the shade 22 is deployed by the biasing force of the basing mechanism 50. Retracting force generated by the retracting mechanism 30 is applied to the shade 22. However, the biasing force generated by the biasing mechanism 50 exceeds the retracting force generated by the retracting mechanism 30. Accordingly, deployment of the shade 22 by the biasing force of the biasing mechanism 50 continues until the substantially entire window 16 is covered by the shade 22. In the state of the shade 22 covering the substantially entire window 16, the stay 40 is received by the holding members 90 in the upper portion of the window 16. As a result, the shade device 20 comes into the deploying state.

The biasing force generated by the biasing mechanism 50 in the deploying state is kept larger than the retracting force generated by the retracting mechanism 30 to press the stay 40 against the holding members 90. This structure maintains the shade 22 in the deploying state covering the substantially entire window 16.

Even in an intermediate stage of deployment of the shade 22, the constant force spring 56 at the portion stored within the guide rail 70 maintains an S-curve shape. Accordingly, wobble of the rod 60 within the guide rail 70 is reduced similarly to backlash in the stored state.

The holding members 90 are members fixed to the upper part of the window 16 of the rear-side door 10, and configured to hold the stay 40 while preventing movement of the stay 40 upward and inward in the interior of the vehicle. According to this example, the pair of holding members 90 are located at opposed two corners of the window 16 on the rear-side door 10. The pair of holding members 90 are opened to the opposed sides and to below. Both end portions of the stay 40 are fitted to the pair of holding members 90 from below to be received by the holding members 90. The holding members 90 regulate movements of the stay 40 and the shade 22 upward and inward in the interior of the vehicle in the deploying state, and prevent rattle, for example. Upward movements of the stay 40 and the shade 22 and the like may be also regulated by regulation of a sliding position of the rod 60 with respect to the guide rail 70, or regulation of an extractable amount of the shade 22 from the retracting mechanism 30, for example. Accordingly, the holding members 90 may be eliminated.

The stay 40 in the foregoing deploying state is lowered by a hand of an occupant or the like. At this time, upward biasing force generated by the biasing mechanism 50 is applied to the stay 40; therefore, the stay 40 is lowered while resisting the biasing force of the biasing mechanism 50. The shade 22 connected to the stay 40 is sequentially retracted by the retracting mechanism 30 in accordance with lowering of the stay 40.

Even in an intermediate stage of storage of the shade 22, the constant force spring 56 at the portion stored within the guide rail 70 maintains an S-shaped curve. Accordingly, wobble of the rod 60 within the guide rail 70 is reduced similarly to wobble in the stored state.

When the stay 40 reaches the lower edge portion of the window 16, the locking protrusion 42 is locked by the locking mechanism 80. In this state, upward movement (deploying direction) is prevented. Accordingly, the stored state of the shade device 20 is maintained.

Figure 14:
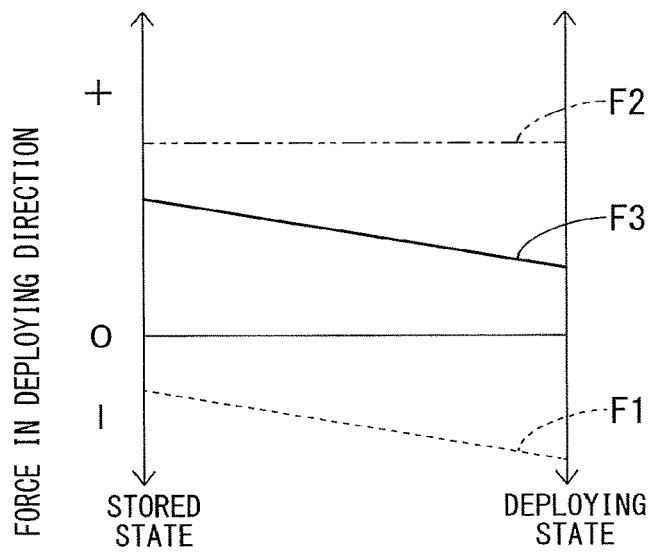
FIG. 14 is a view illustrating a relationship between a deploying amount of a shade of the shade device and force acting on the shade in a deploying direction.

FIG. 14 is a view illustrating a relationship between a deploying amount of the shade 22 and force acting on the shade 22 in the deploying direction. The horizontal axis represents an extracted amount of the shade 22 between the stored state and the deploying state. The vertical axis indicates the level and direction of force acting on the shade 22 on the assumption that force in the deploying direction is "positive (+)", and that force in the storing direction is "negative (−)". A dotted line indicates biasing force F1 generated by the retracting mechanism 30. An alternate long and two short dashes line indicates biasing force F2 generated by the constant force spring 56 of the biasing mechanism 50. A solid line indicates force F3 as synthesis force of these biasing forces.

The retracting mechanism 30 generates biasing force in the retracting direction by using the torsion coil spring 37. Accordingly, the biasing force F1 shows such a characteristic that the level of force in the storing direction gradually increases in accordance with increase in the extracted amount of the shade 22. The constant force spring 56 generates the biasing force F2 by restoring force generated when the linearly extracted outer surface side of the constant force spring 56 wound in a spiral shape returns to the original shape having the original radius of curvature. In this case, the constant force spring 56 generates the substantially constant biasing force F2 regardless of the extracted amount of the shade 22. Accordingly, the biasing force F3 finally acting on the shade 22 shows a characteristic of gradual decrease with small inclination in accordance with large extraction of the shade 22. According to this example, the biasing force F3 indicates inclination (change degree) in accordance with inclination (change degree) of the biasing force F1 generated by the retracting mechanism 30.

For more securely shifting the shade 22 into the deploying state, force in the deploying direction needs to act on the shade 22 in any levels of the extracted amount of the shade 22. The biasing force F3 finally acting on the shade 22 becomes the minimum in the largest extraction of the shade 22, i.e., in the deploying state. Accordingly, the biasing force F3 needs to exceed force necessary for deploying the shade 22 in the deploying state. The characteristics of the constant force spring 56 and others are therefore determined in accordance with these requirements. As described above, the biasing force F3 changes with small inclination in accordance with the extracted amount of the shade 22. Accordingly, even when the characteristics of the constant force spring 56 are determined in accordance with the foregoing requirements, the maximum reduction of the biasing force F3 acting on the shade 22 is achievable. As a result, the shade 22 is extracted with appropriate force.

Figure 15:
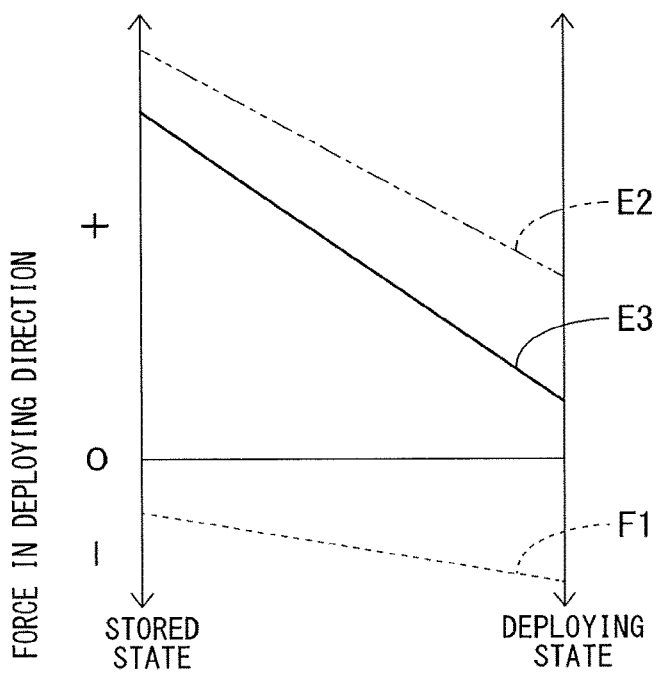
FIG. 15 is a view illustrating a relationship between a deploying amount of a shade and force acting on the shade in a deploying direction according to a conventional example.

On the other hand, FIG. 15 illustrates a relationship between a deploying amount of a shade and force in a deploying direction acting on the shade, when biasing force for deploying the shade is generated by a spring motor similarly to DE 102007016154 A1. In this figure, a dotted line indicates the biasing force F1 generated by a retracting mechanism. An alternate long and two short dashes line indicates biasing force E2 generated by the spring motor. A solid line indicates force E3 as synthesis force of these biasing forces.

In this case, the biasing force E2 generated by the spring motor shows such a characteristic that the level of force in the deploying direction gradually decreases in accordance with increase in the extracted amount of the shade 22. Accordingly, the biasing force E3 finally acting on the shade 22 shows a characteristic of decrease with sharp inclination in accordance with large extraction of the shade 22. According to this example, the biasing force E3 indicates inclination (change degree) as a combination of inclination (change degree) of the biasing force F1 generated by the retracting mechanism 30 and inclination (change degree) of the biasing force E2 generated by the spring motor.

For more securely shifting the shade into the deploying state, the biasing force E3 needs to exceed force necessary for deploying the shade in the deploying state as described above. The characteristics of the spring motor and the like are determined in accordance with these requirements. When the characteristics of the spring motor are determined in this manner, the biasing force E3, which changes with sharp inclination in accordance with the extracted amount of the shade, becomes excessively large force acting on the shade even in the deploying state. In this case, the shade in the stored state suddenly starts movement by the large biasing force E3, and may be completely extracted with this level of force.

Advantageous Effects and Others

According to the shade device 20 thus constructed, the shade 22 in the stored state is retracted by the retracting mechanism 30. In this condition, the rod 60 is biased by biasing force of the constant force spring 56 of the biasing mechanism 50 in the direction of moving the shade 22 in the deploying state. This stored state is maintained by the locking mechanism 80 which locks movement of the rod 60. In this state, the constant force spring 56 having a curl generates force for biasing the rod 60 in the deploying direction of the shade 22 by restoring force of the constant force spring 56 for returning to the original state from an expanded state within the guide rail 70. The expanded constant force spring 56 in this state tends to be curve, but is not largely curved while stored within the guide rail 70.

When the locking mechanism 80 is unlocked, the rod 60 moves in the deploying direction of the shade 22 by biasing force of the constant force spring 56. Simultaneously, the stay 40 attached to the tip end portion of the rod 60 also moves in the deploying direction of the shade 22, whereby the shade 22 comes into the deploying state extracted from the retracting mechanism 30. The biasing force of the constant force spring 56 is kept substantially constant regardless of the extracted amount. Accordingly, the rod 60 is movable with appropriate force necessary for extracting the shade 22 from the retracting mechanism 30 in all stages of extraction of the shade 22.

In this case, the rod 60 and the extracted portion of the constant force spring 56 are stored within the guide rail 70. Accordingly, the rod 60 and the extracted portion of the constant force spring 56 are movable while guided within the guide rail 70; therefore, the biasing force of the constant force spring 56 is efficiently transmitted to the rod 60.

For shifting the shade 22 from the deploying state to the stored state, the stay 40 is moved toward the retracting mechanism 30 by operational force or the like of the occupant to retract and store the shade 22 by using the retracting mechanism 30. More specifically, force in the direction opposite to the biasing force direction of the constant force spring 56 is applied to the stay 40 or the like by operational force or the like of the occupant to move the stay 40 and the rod 60 to positions in the stored state.

As described above, the biasing force of the constant force spring 56 of the biasing mechanism 50 for generating force for biasing the rod 60 in the deploying direction of the shade 22 is substantially constant regardless of the extracted amount of the shade 22. In this case, the rod is movable with appropriate force necessary for extracting the shade 22 from the retracting mechanism 30 in all stages for extracting the shade 22. Accordingly, force (acceleration) at a start of extraction of the shade 22 or other occasions decreases. Moreover, the biasing force of the constant force spring 56 of the biasing mechanism 50 is efficiently transmitted to the rod 60. From this viewpoint as well, the biasing force generated by the constant force spring 56 is allowed to decrease to the smallest possible force. Accordingly, extraction of the shade with appropriate force is achievable.

As a result, the stay 40 and the shade 22 are allowed to move at appropriate and moderate speed, so that the operation gives a feeling of quality. Noise and impact generated by contact between the stay 40 and the upper edge portion of the window opening 11 decrease, whereby discomfort caused by noise lowers. Moreover, damage to the stay 40 decreases.

Furthermore, the constant force spring 56 is stored within the guide rail 70, in which condition contact between the constant force spring 56 and peripheral components and the like decreases even in a state before attachment of the shade device 20 to a vehicle. Accordingly, peripheral components are not easily damaged by the constant force spring 56. In addition, the structure of the rod 60 and the constant force spring 56 are within the guide rail 70 contributes to compactness of the shade device 20.

Moreover, the rod 60 within the guide rail 70 is facing to the outer surface of the portion of the constant force spring 56 within the guide rail 70. In this case, the constant force spring 56 at the portion is waved in an arch shape within the guide rail 70 in the stored state comes into contact with the rod 60 at a portion close to the supporting member 54, and presses the rod 60 against the inner surface of the guide rail 70. In addition, the base end portion of the rod 60 is connected to the tip end portion of the constant force spring 56, and therefore pressed toward the inner surface of the guide rail 70 by the tip end portion of the constant force spring 56. As a result, the rod 60 at the position close to the supporting member 54 and at the position of the base end portion is pressed toward the inner surface of the guide rail 70. Accordingly, vibrations of the rod 60 within the guide rail 70 in accordance with vibrations given during traveling of the vehicle, and noise generated by the vibrations decrease.

When the rod 60 moves in the deploying direction of the shade 22, the constant force spring 56 restores to the wound state while maintaining the state pressed against a fixed position of the rod 60. Accordingly, sliding noise is difficult to generate from the contact portion between the constant force spring 56 and the rod 60.

Modifications

The respective configurations described in the foregoing embodiments and modifications may be appropriately combined as long as no mutual inconsistency is produced.

While the present invention has been described in detail herein, the present invention is not limited, in any aspects, to the description presented only by way of example. A countless number of modifications not presented herein are considered as examples occurring from the present invention without departing from the scope of the invention.

What is claimed is:

1. A shade device for a vehicle, comprising:
   a shade deployed to shade a window of the vehicle in a deploying state, and stored in a stored state;
   a retracting mechanism attached to a base end of the shade and retracting the shade in the stored state;
   a stay attached to a tip end of the shade;

a constant force spring that generates biasing force by its extraction;

a rod, its tip end portion being attached to the stay and its base end portion being connected to a tip portion of an extracted portion of the constant force spring, biased in a deploying direction of the shade by biasing force of the constant force spring, and transmitting the biasing force to the stay;

a guide rail that is a member having a tube shape to store the rod and the extracted portion of the constant force spring in the stored state of the shade, and guides the rod when the shade shifts from the stored state to the deploying state; and a locking mechanism that locks the rod in the stored state of the shade, wherein the extracted portion of the constant force spring is in an S shape within the guide rail to press the rod toward an inner surface of the guide rail in the stored state of the shade.

2. The shade device for a vehicle according to claim 1, wherein the constant force spring is wound in a coil shape around a supporting member in the deploying state, the rod is facing an outer surface of the portion of the constant force spring within the guide rail, the outer surface of the constant force spring being a surface facing an outer circumferential side in a state where the constant force spring is wound in the coil shape, and the constant force spring at the portion extracted within the guide rail includes a portion contacting the rod while waved in an arch shape bowed toward the rod and a portion connected to the base end portion of the rod while waved toward the rod to form an S shape within the guide rail in the stored state of shade.

3. A shade device for a vehicle, comprising:

a shade deployed to shade a window of the vehicle in a deploying state, and stored in a stored state, the shade being retractable to a stored state;

a stay attached to a tip end of the shade;

a constant force spring that generates biasing force;

a rod, its tip end portion being attached to the stay and its base end portion being connected to a tip portion of an extracted portion of the constant force spring, biased in a deploying direction of the shade by biasing force of the constant force spring, and transmitting the biasing force to the stay; and a guide rail that is a member having a tube shape to store the rod and the extracted portion of the constant force spring in the stored state of the shade, and guides the rod when the shade shifts from the stored state to the deploying state;

wherein the extracted portion of the constant force spring is in an S shape within the guide rail to press the rod toward an inner surface of the guide rail in the stored state of the shade.

* * * * *